(12) United States Patent
Malucelli et al.

(10) Patent No.: US 8,940,206 B2
(45) Date of Patent: Jan. 27, 2015

(54) PROCESS FOR THE ANTI-STICKING TREATMENT OF POLYMER PELLETS

(75) Inventors: Decio Malucelli, Ferrara (IT); Marco Consalvi, Occhiobello (IT)

(73) Assignee: Basell Poliolefine Italia S.r.l., Milan (IT)

( * ) Notice: Subject to any disclaimer, the term of this patent is extended or adjusted under 35 U.S.C. 154(b) by 372 days.

(21) Appl. No.: 13/318,767

(22) PCT Filed: May 6, 2010

(86) PCT No.: PCT/EP2010/056159
§ 371 (c)(1),
(2), (4) Date: Nov. 3, 2011

(87) PCT Pub. No.: WO2010/130619
PCT Pub. Date: Nov. 18, 2010

(65) Prior Publication Data
US 2012/0053278 A1    Mar. 1, 2012

Related U.S. Application Data

(60) Provisional application No. 61/216,751, filed on May 21, 2009.

(30) Foreign Application Priority Data

May 15, 2009    (EP) .................................... 09160426

(51) Int. Cl.
| B29B 9/16 | (2006.01) |
| B29B 13/06 | (2006.01) |
| F21V 8/00 | (2006.01) |
| G06F 1/16 | (2006.01) |
| B29B 9/06 | (2006.01) |

(52) U.S. Cl.
CPC ................. B29B 9/16 (2013.01); B29B 13/065 (2013.01); G02B 6/0008 (2013.01); G06F 1/1626 (2013.01); B29B 9/065 (2013.01); B29B 2009/163 (2013.01); B29B 2009/165 (2013.01)
USPC ........................................ 264/141; 264/142

(58) Field of Classification Search
CPC .......... B29B 9/16; B29B 9/065; B29B 13/065
USPC ................................. 264/141, 142
See application file for complete search history.

(56) References Cited

U.S. PATENT DOCUMENTS

| 4,359,544 A | 11/1982 | Hwo et al. |
| 5,041,251 A * | 8/1991 | McCoskey et al. ........... 264/141 |
| 5,206,292 A | 4/1993 | Hwo et al. |
| 5,219,912 A | 6/1993 | Takahashi et al. |
| 5,623,012 A | 4/1997 | Hwo et al. |

(Continued)

FOREIGN PATENT DOCUMENTS

| CN | 1373786 | 10/2002 |
| CN | 1782646 | 6/2006 |
| CN | 101392091 | 3/2009 |
| CN | 101475695 | 7/2009 |
| EP | 1650516 | 4/2006 |
| JP | H08155202 A | 6/1996 |
| JP | H08290424 A | 11/1996 |

(Continued)

*Primary Examiner* — Yogendra Gupta
*Assistant Examiner* — Alison Hindenlang

(57) ABSTRACT

A process for the anti-sticking treatment of polymer pellets comprising:
a) pelletizing the polymer in the presence of cooling water;
b) drying the polymer pellets by means of a centrifugal drier, wherein in step b) an aqueous composition comprising an anti-sticking agents is metered inside said centrifugal drier.

8 Claims, 20 Drawing Sheets

(56) References Cited

U.S. PATENT DOCUMENTS

| | | |
|---|---|---|
| 5,638,606 A | 6/1997 | Bryan et al. |
| 6,328,728 B1 | 12/2001 | Holladay et al. |
| 6,616,968 B2 | 9/2003 | Bostrom et al. |
| 7,171,762 B2 | 2/2007 | Roberts et al. |
| 8,361,364 B2 | 1/2013 | Eloo et al. |
| 2008/0072447 A1 | 3/2008 | Hehnberger |

FOREIGN PATENT DOCUMENTS

| | | |
|---|---|---|
| JP | H11292978 A | 10/1999 |
| JP | 2005225227 A | 8/2005 |
| JP | 2008542062 A | 11/2008 |
| WO | WO 9101207 A1 * | 2/1991 |
| WO | WO-0220188 | 3/2002 |
| WO | WO-2004111111 | 12/2004 |

* cited by examiner

Figure 2A:
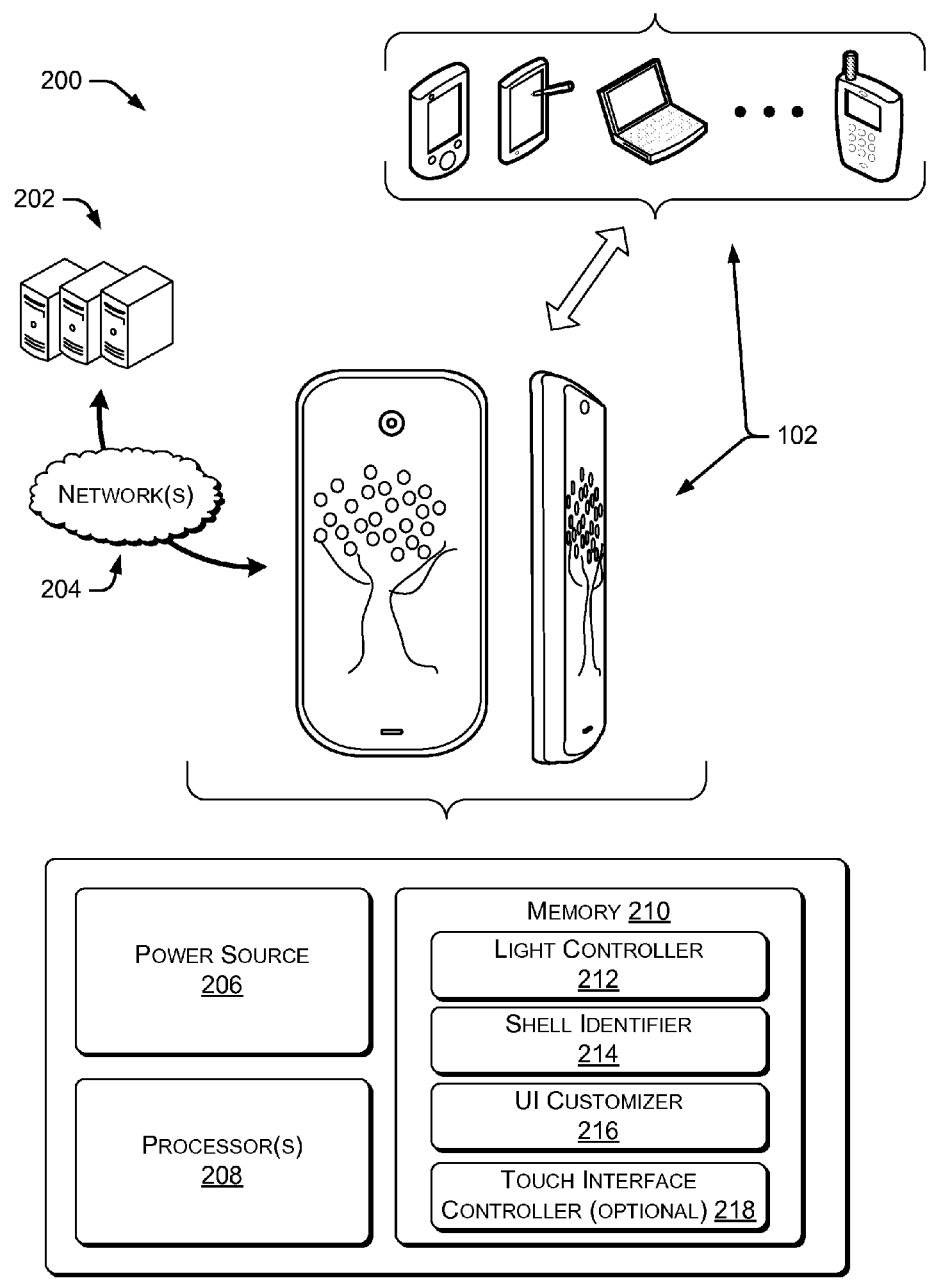
Figure 2C:
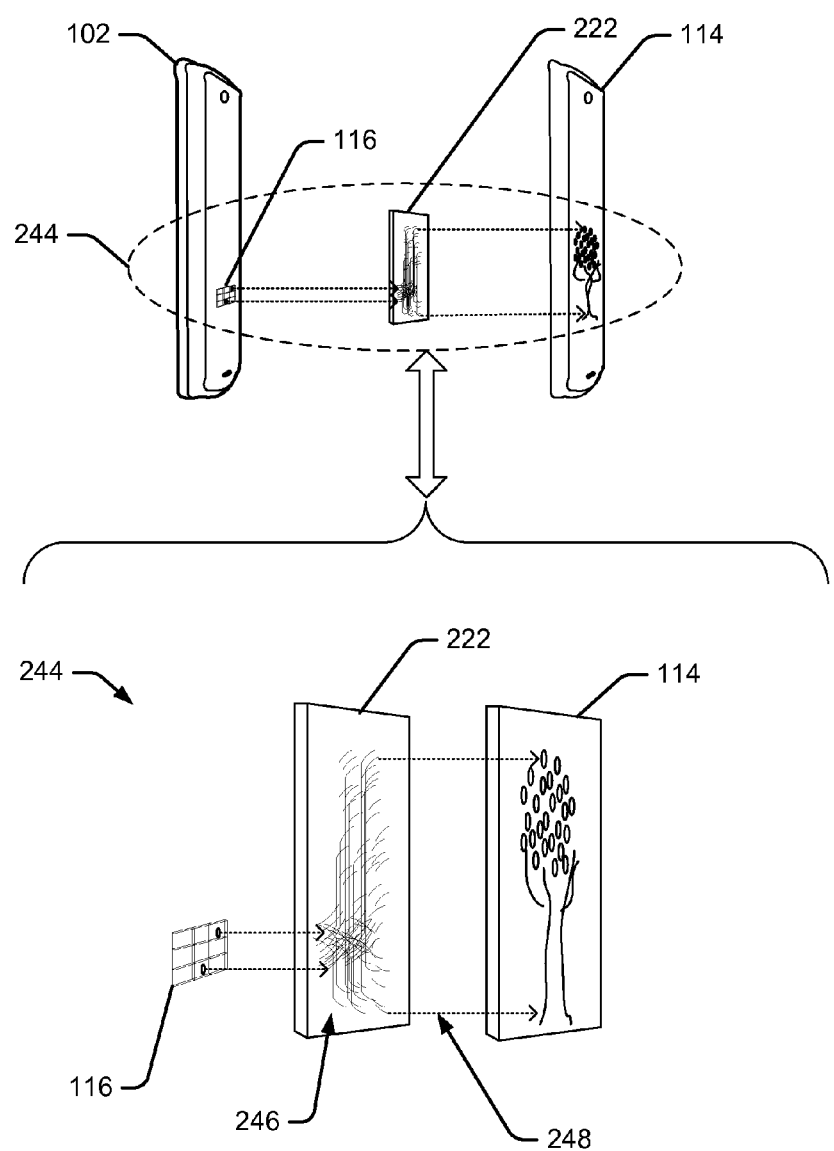
Figure 3A:
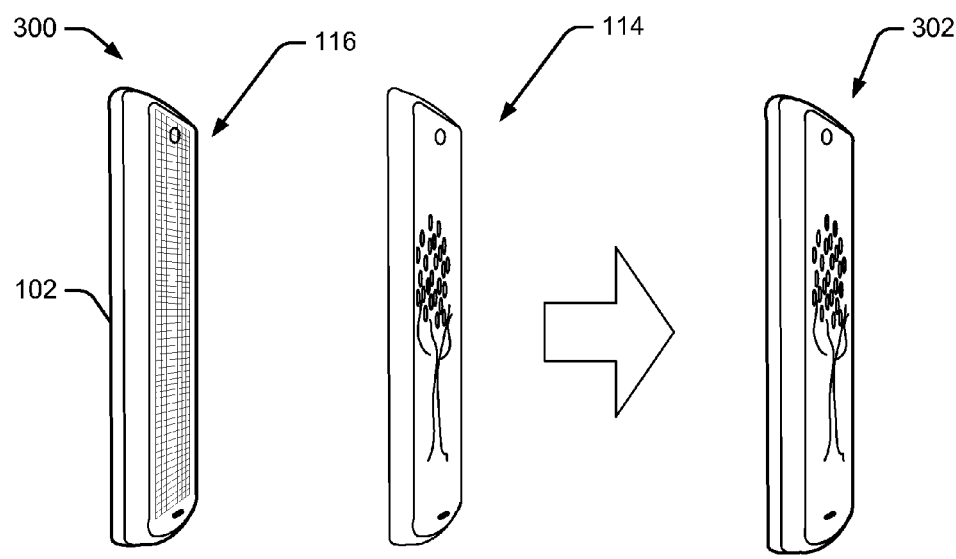
Figure 3B:
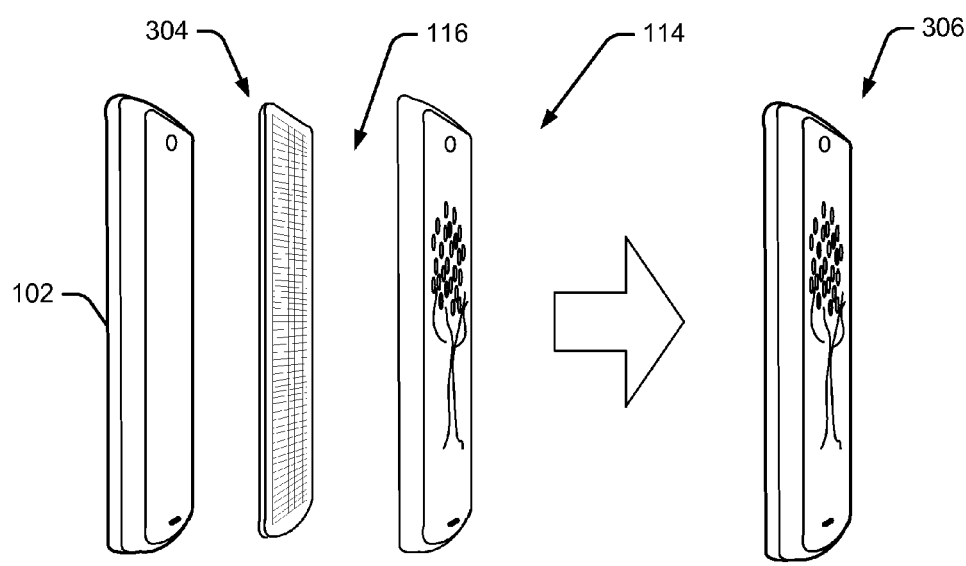
Figure 4:
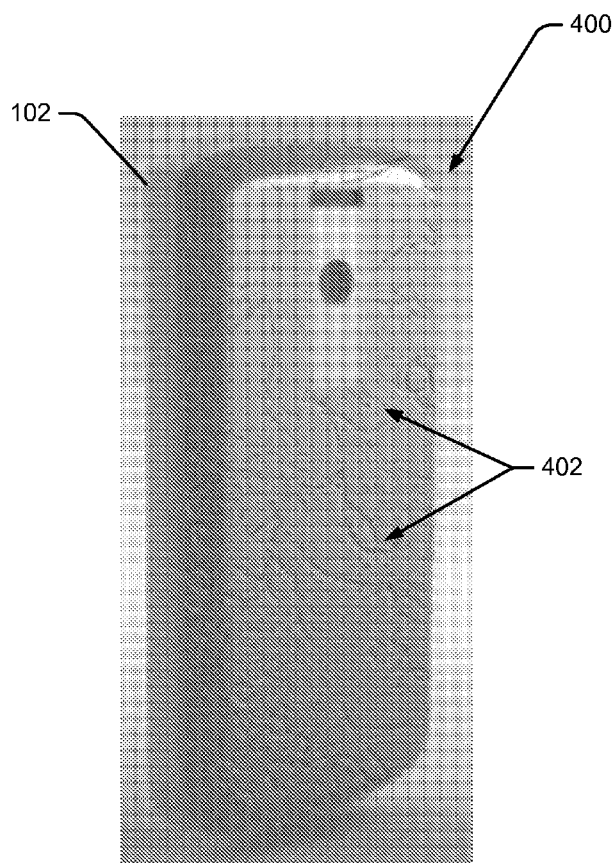
Figures 5A, 5B:
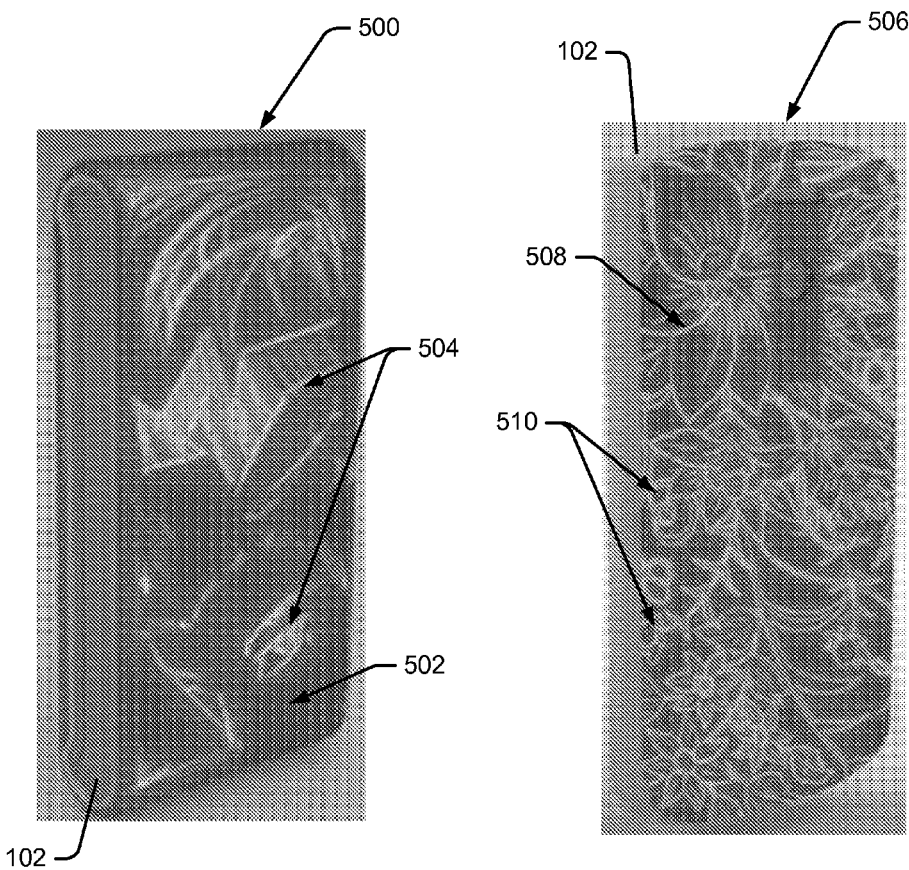
Figures 6A, 6B:
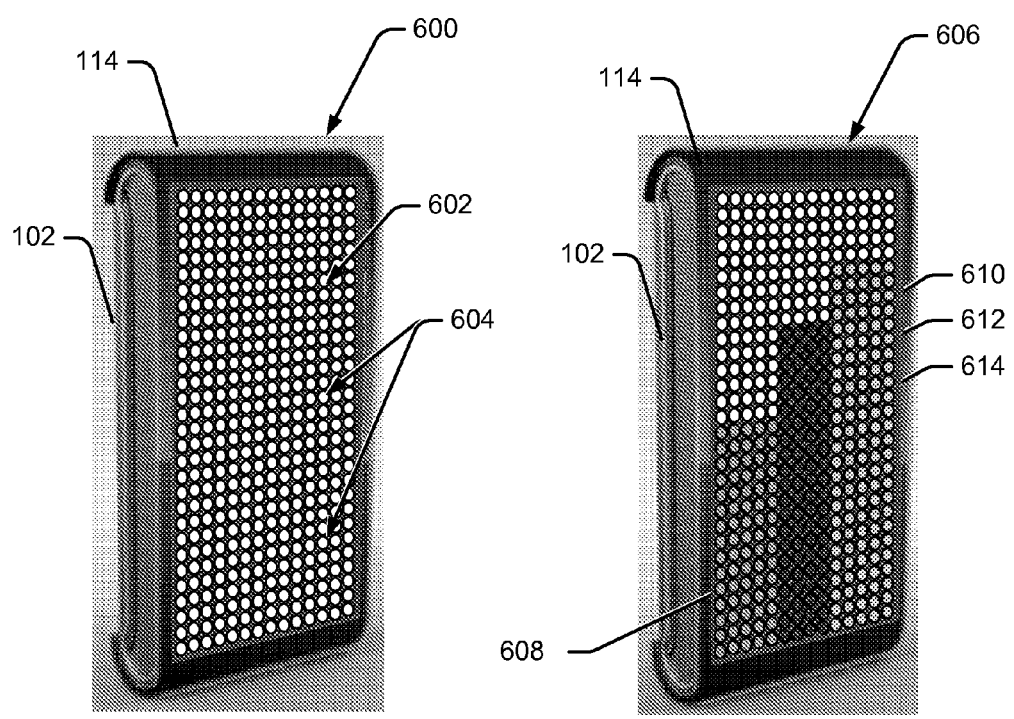
Figure 7C:
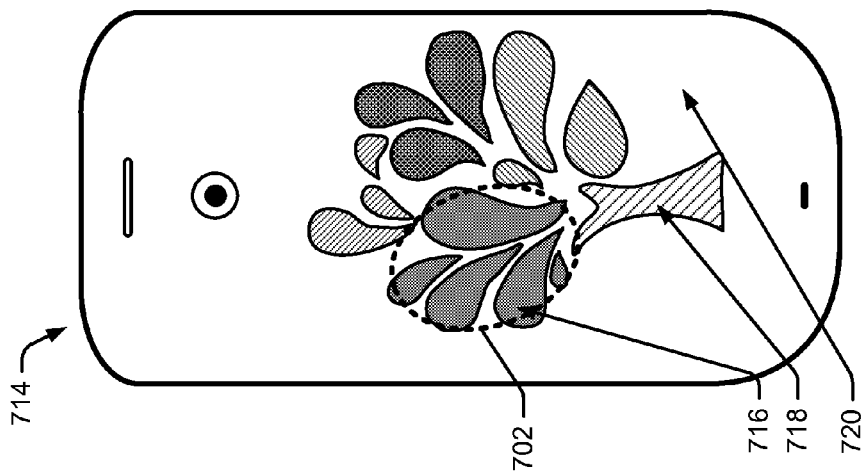
Figure 7B:
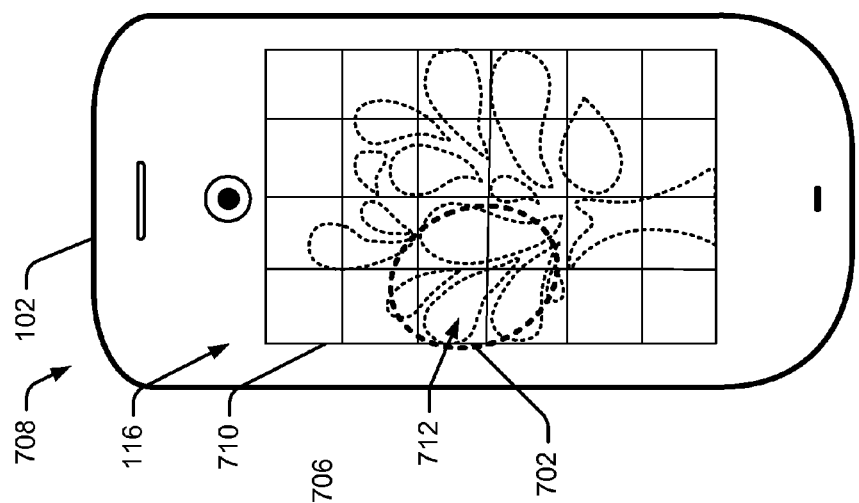
Figure 7A:
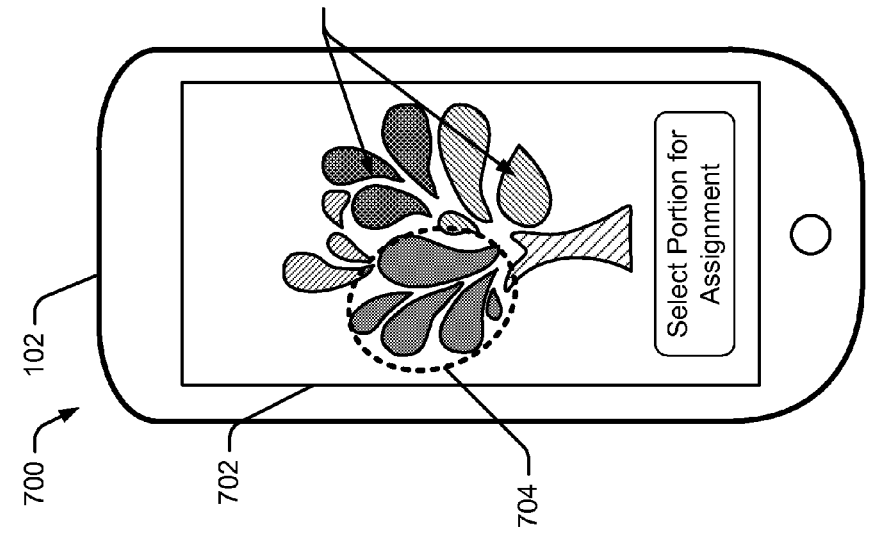
Figure 8:
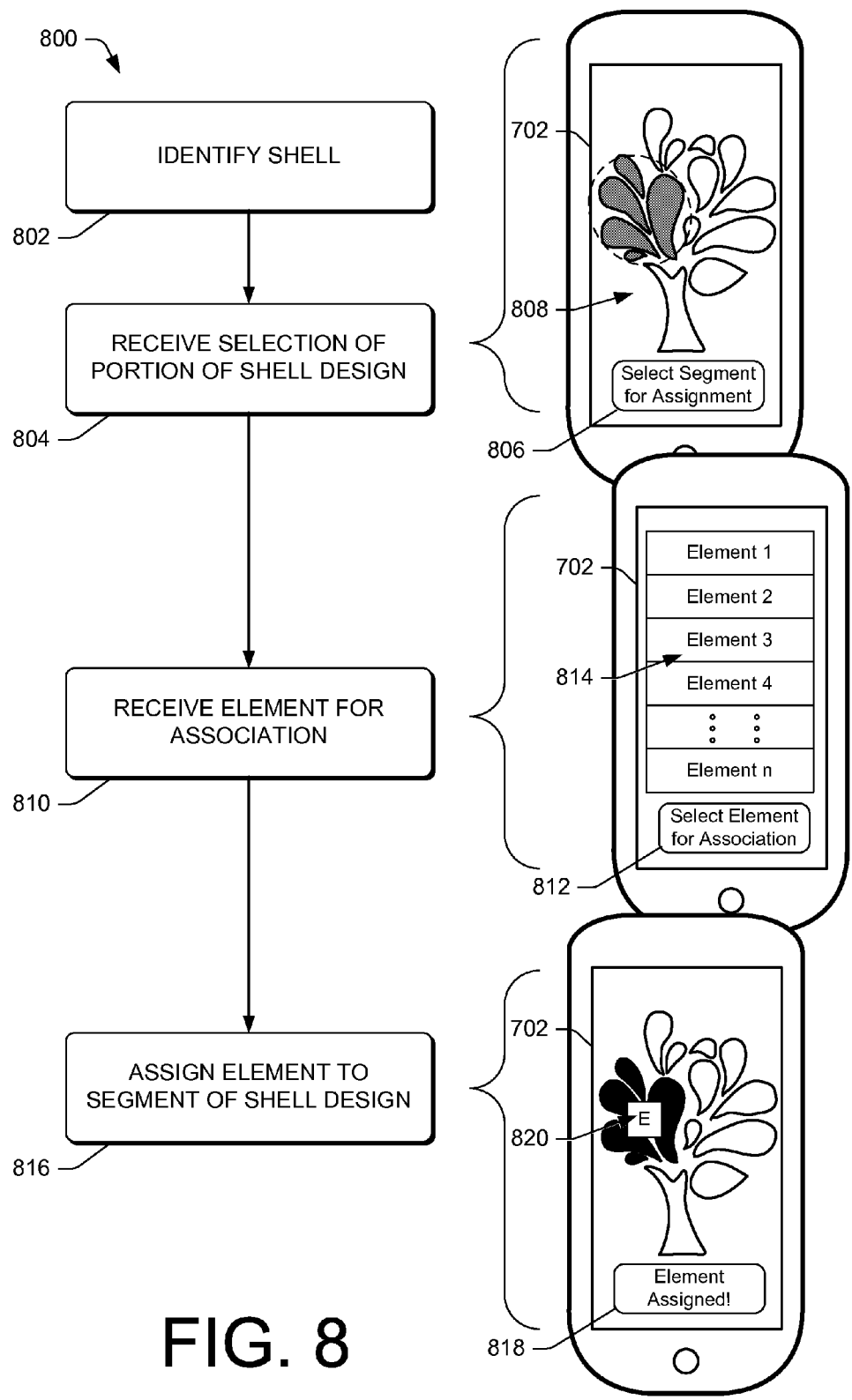
Figure 10A:
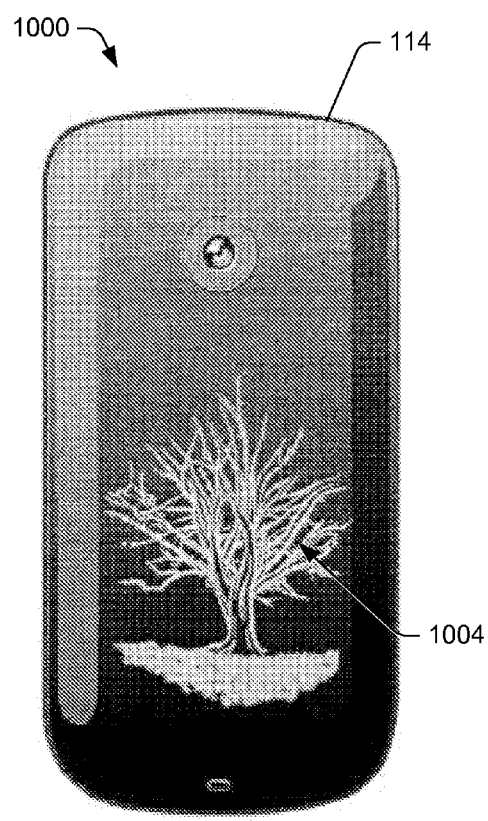
Figure 10B:
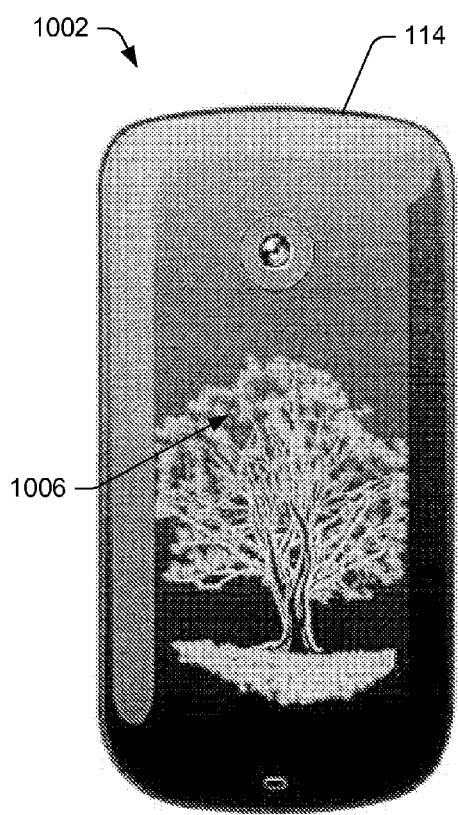
Figure 11:
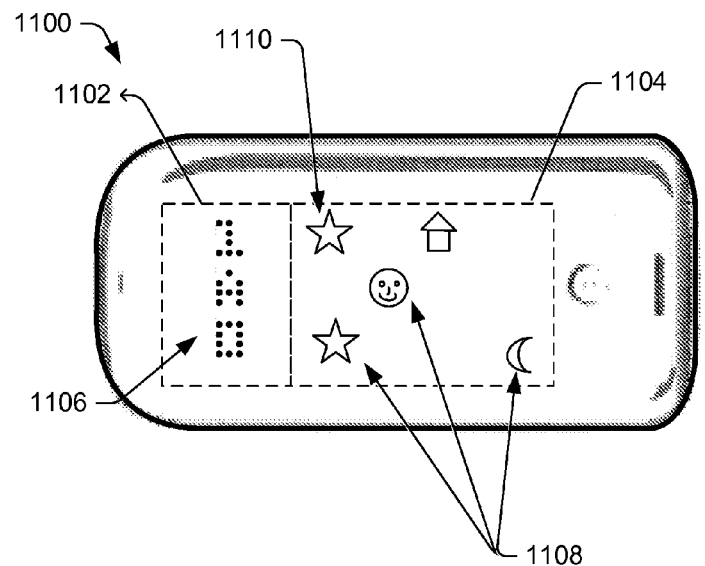
Figure 12:
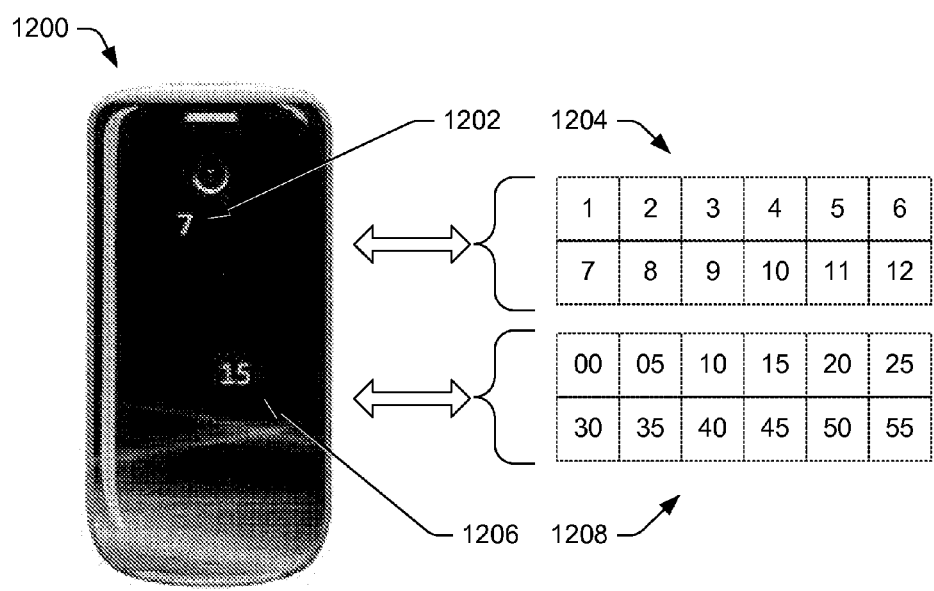
Figure 13:
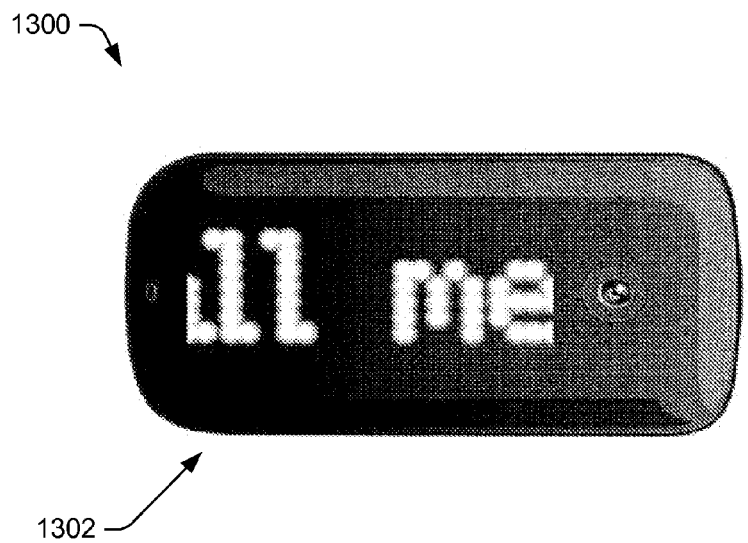
Figure 14:
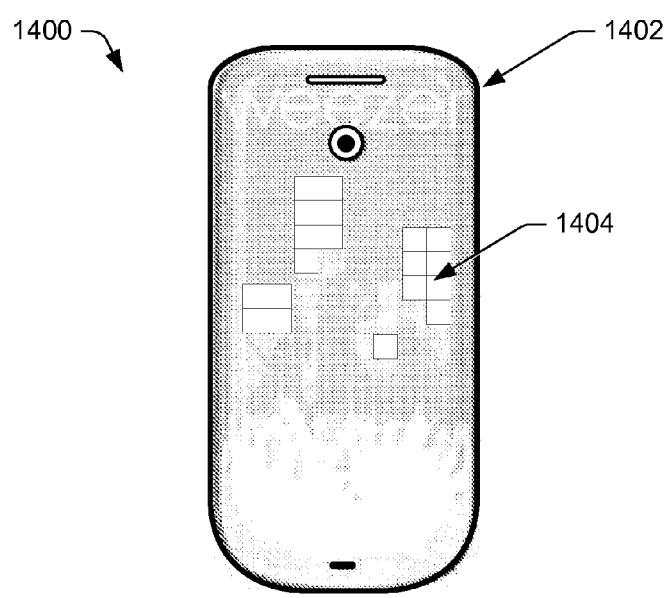
Figures 15A, 15B:
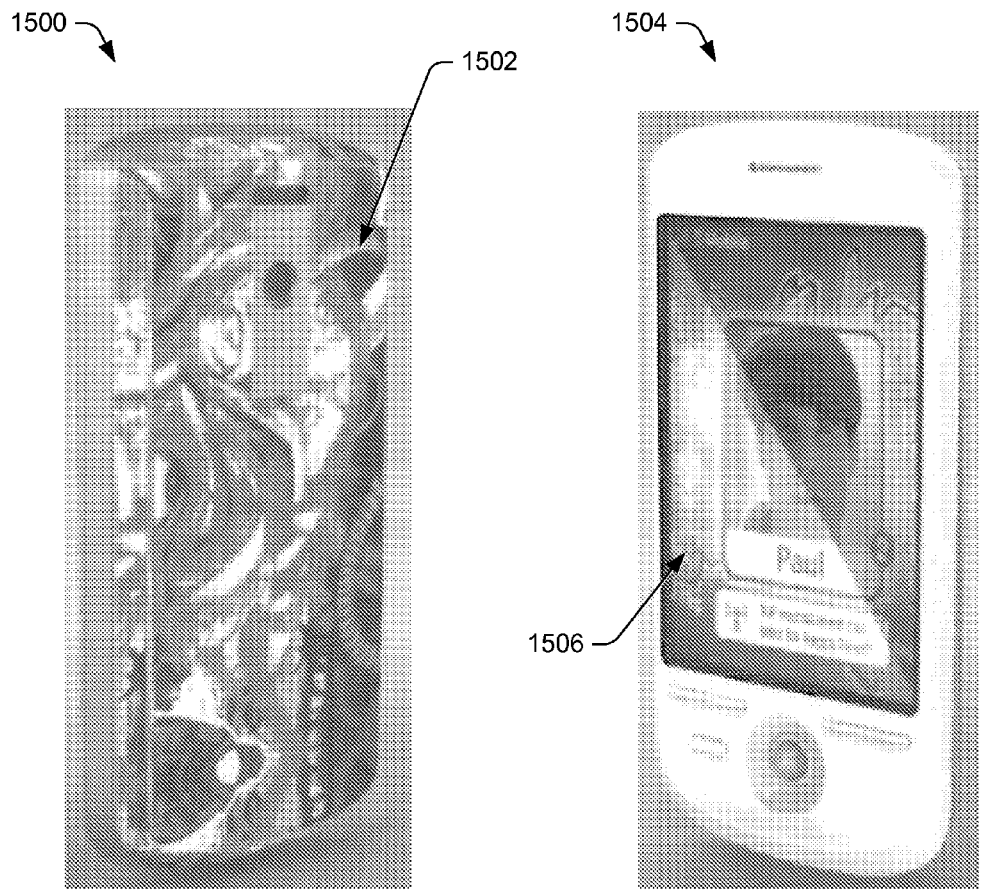
Figure 16:
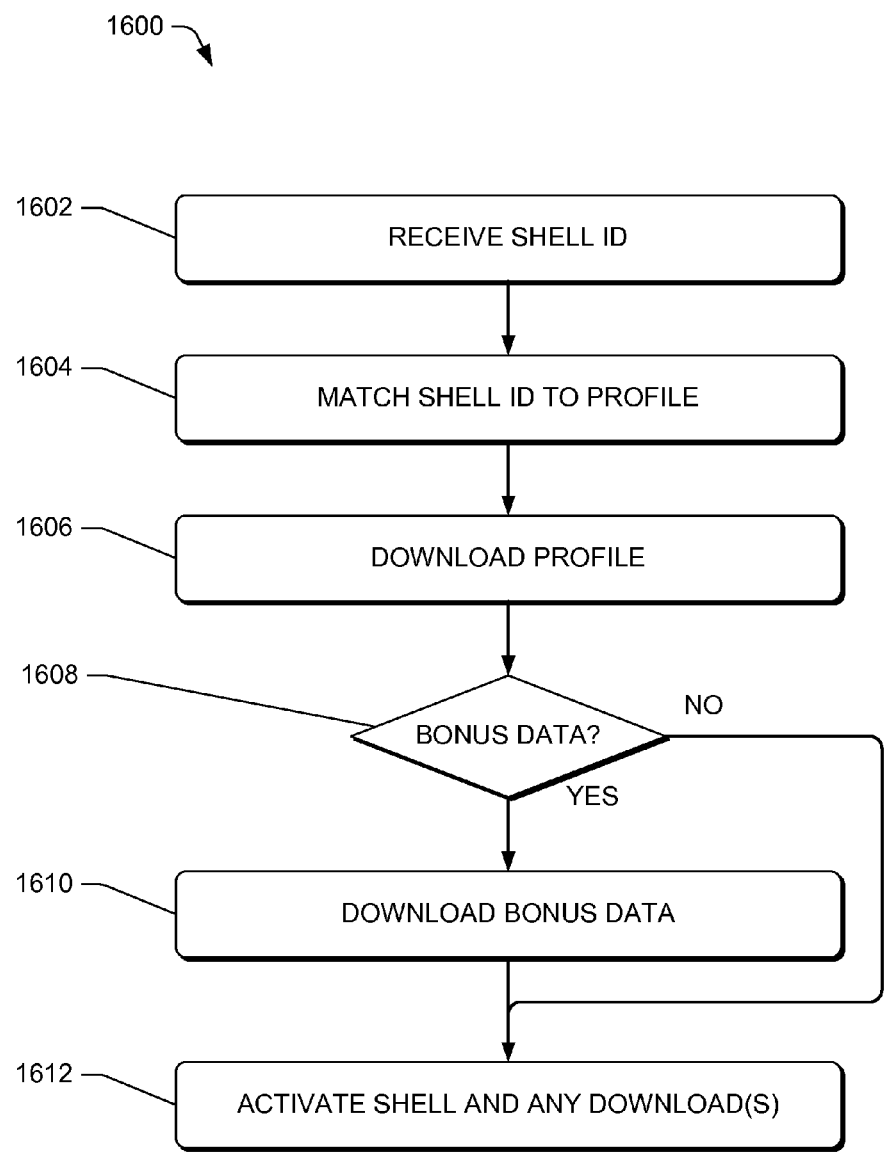
Figure 17:
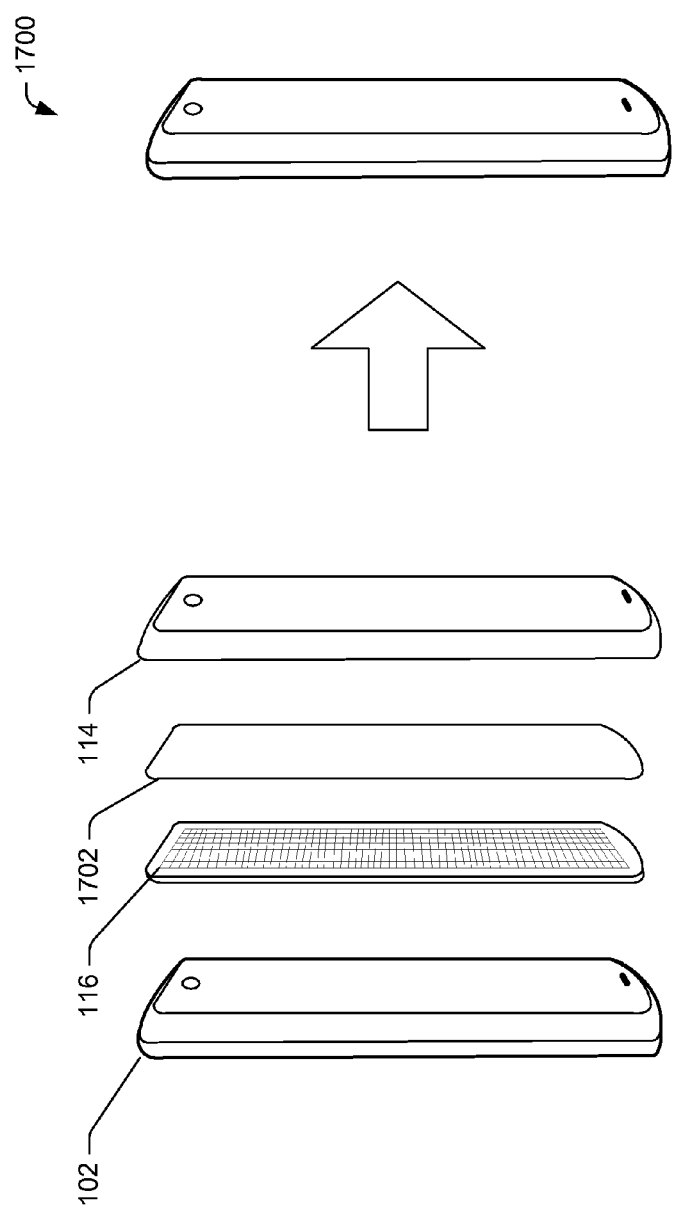
Figure 18:
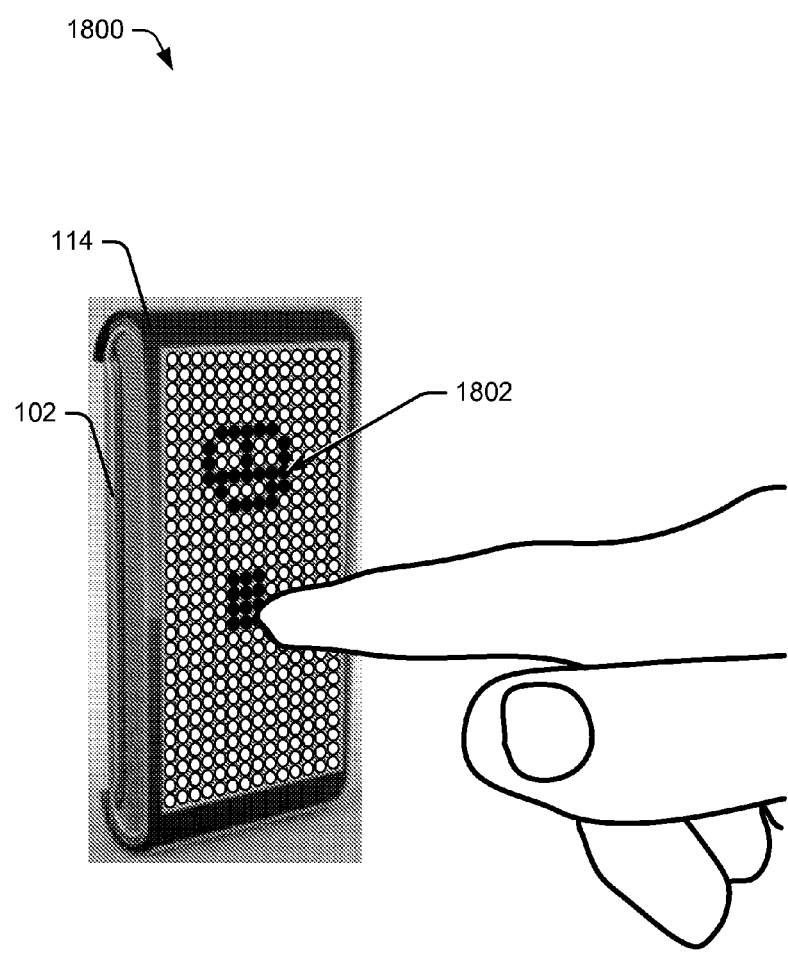
Figure 19:
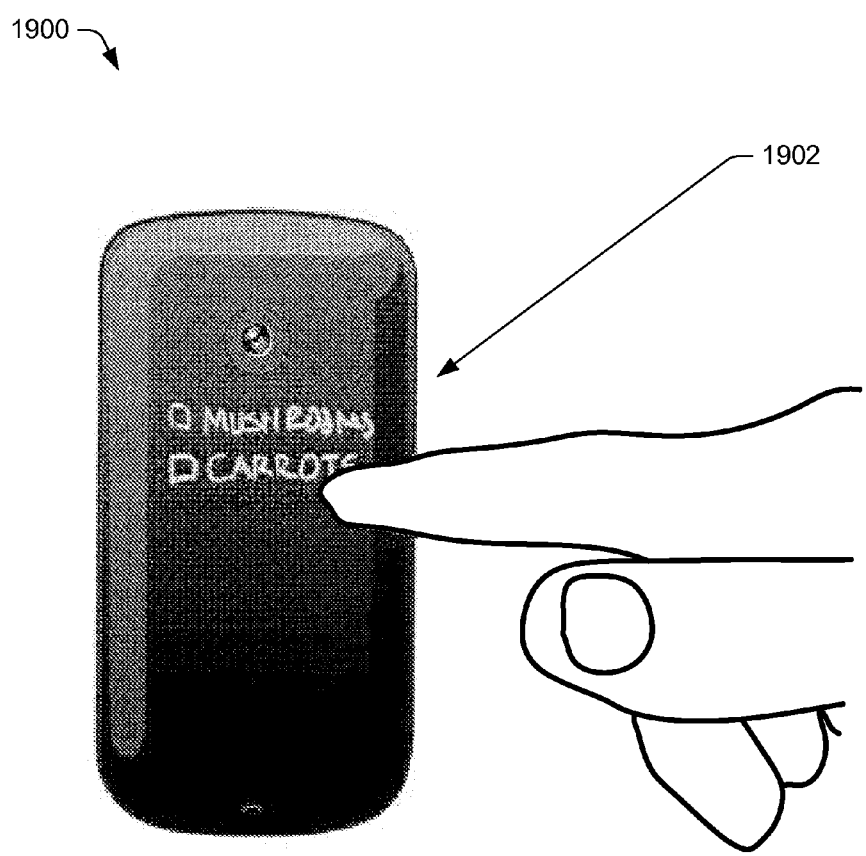

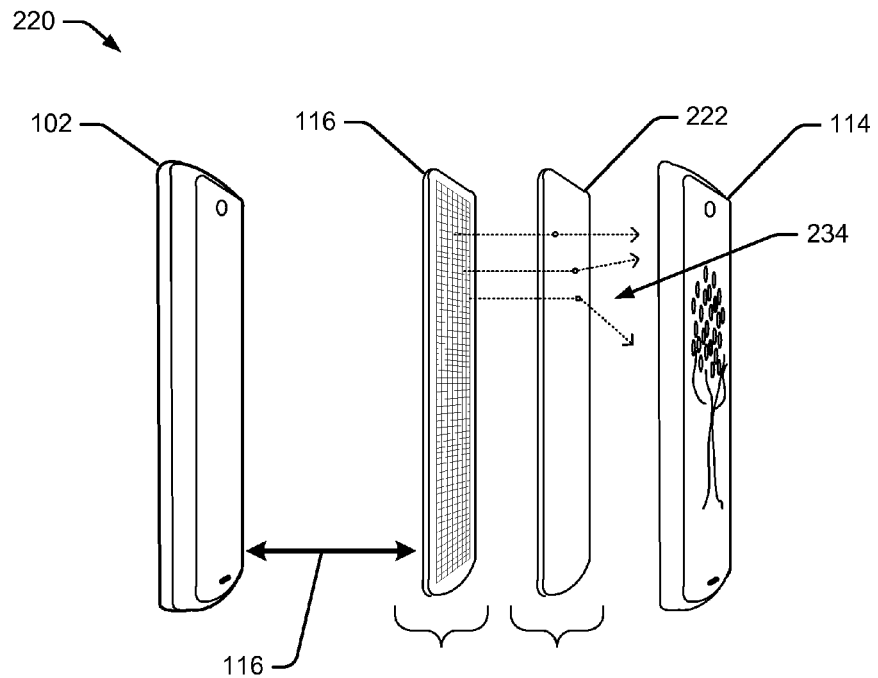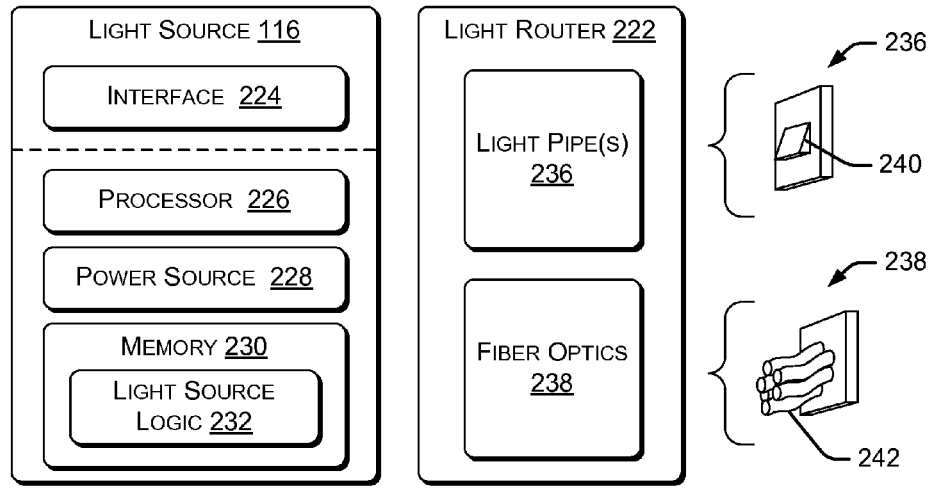
FIG. 2b

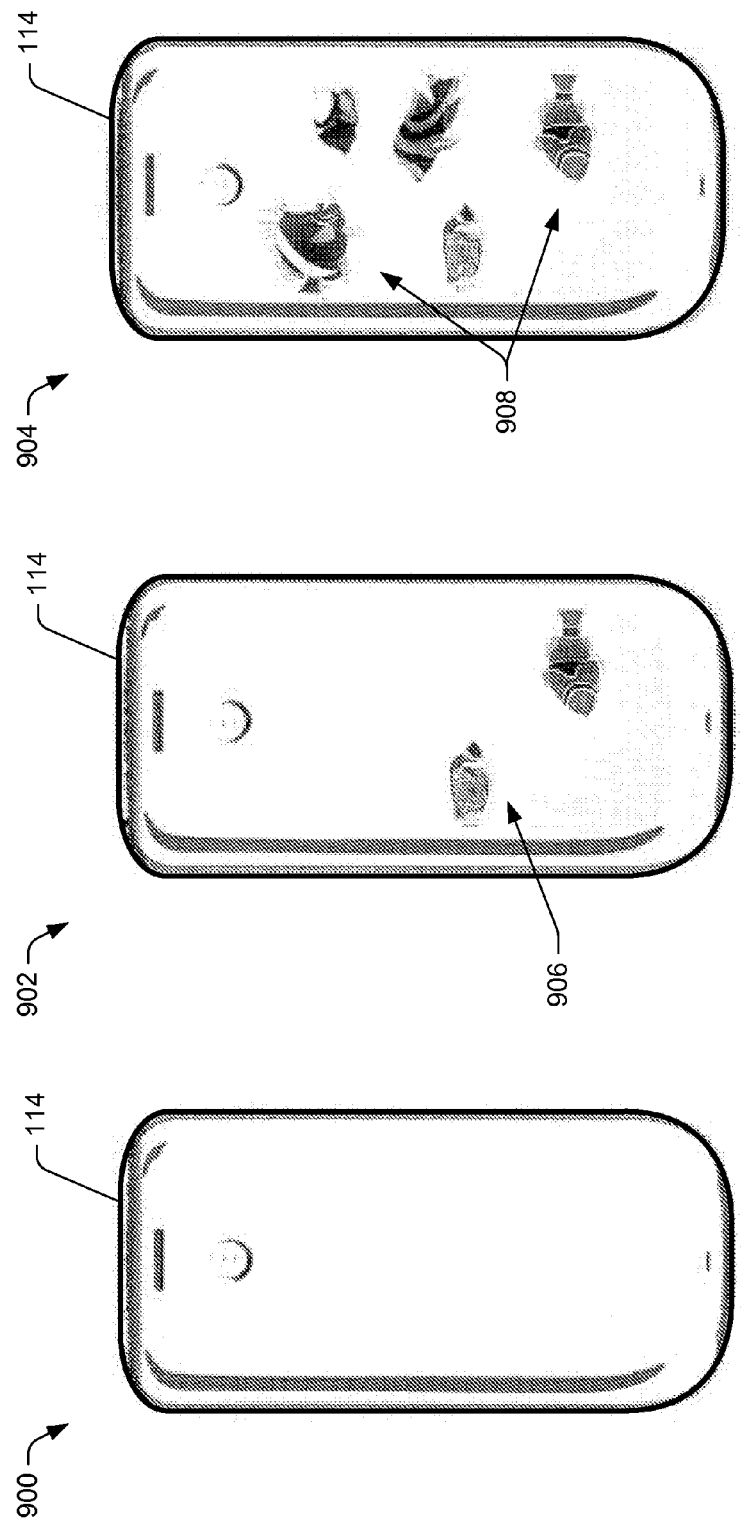

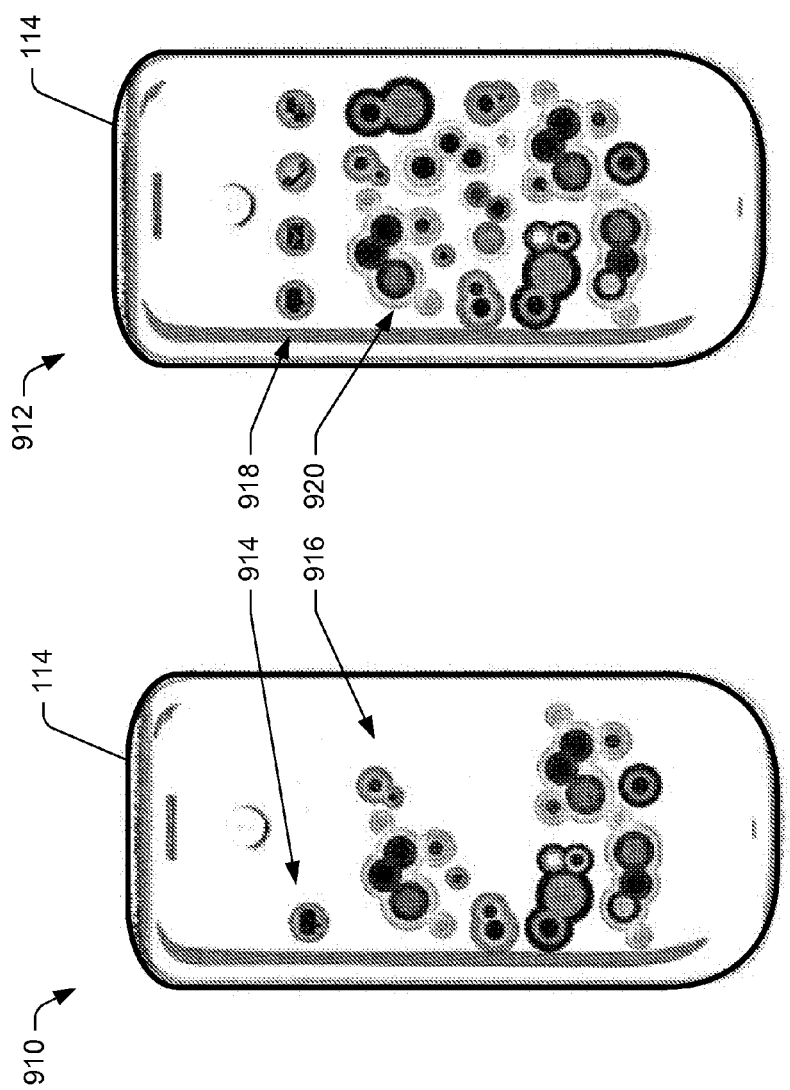

PROCESS FOR THE ANTI-STICKING TREATMENT OF POLYMER PELLETS

This application is the U.S. national phase of International Application PCT/EP2010/056159, filed May 6, 2010, claiming priority to European Application 09160426.4 filed May 15, 2009 and the benefit under 35 U.S.C. 119(e) of U.S. Provisional Application No. 61/216,751, filed May 21, 2009; the disclosures of International Application PCT/EP2010/056159, European Application 09160426.4 and U.S. Provisional Application No. 61/216,751, each as filed, are incorporated herein by reference.

The present invention relates to a process for the anti-sticking treatment of polymer pellets in order to reduce their tendency to agglomeration.

In particular, the present invention relates to a process for minimizing the tackiness of polymer pellets coming from a cutting system comprising the pelletization of the polymer in the presence of cooling water, and the subsequent drying of the pellets by means of a centrifugal drier.

It is known that most of the plastic resins sold in the market today is in the form of pellets. Plastic resins are sold in the form of pellets to improve transportation, handling, safety and end-user processability characteristics.

It is also known that the extrusion device may be an extrusion line connected to a polymerization plant, as well as a compounding extruder fed directly with pellets and/or polymeric material of different morphology (powder, beads, grains etc). During the extrusion process other ingredients like additives, fillers and/or pigments are usually added to improve the polymer properties. At the end of the extrusion process the molten polymer is forced to flow through a die plate before being cut into pellets.

The size, shape and uniformity of the pellets are important characteristics to be met during the production. The pelletizing step is also important from the operational standpoint. Any malfunction of the pelletizer can result in process shutdown and manufacturing halt with serious financial consequences, especially for large extrusion lines. As a consequence, the pelletization step is recognized to be an important step both in the production line of any polymer production plant and on a compounding line during a further extrusion step.

An efficient and satisfying pelletization is difficult to be achieved particularly when the final polymer exhibits softness and tackiness properties leading to poor flowability and agglomeration of the pellets. These characteristics and behaviours are directly linked to a low cristallinity of the polymer, typical for example of polyolefin copolymers, atactic homopolymers (e.g. atactic polybutene-1), and all the thermoplastic elastomers and thermoplastic polyolefins.

Although this agglomeration generally occurs both for homopolymers and copolymers, it appears to be more severe in the case of copolymers. This is because the copolymers generally have a slower crystallization rate and a lower crystallinity than the homopolymers. For instance, copolymers of butene-1, especially butene-1/ethylene copolymers, show extreme tendency to tackiness during the pelletization, caused by the slow crystallization rate or solidification rate of these copolymers.

In fact, when the pellets leave the cutting blades they are very tacky, and have a tendency to form agglomerates if they collide with each other. After polymer pellets are formed by means of an underwater face cutter or a wet strand cutting pelletizer, the pellets are conveyed to a spin drier in order to minimize the amount of entrained water.

Phenomena of sticking and agglomeration of pellets can easily occur along the line connecting the pelletizer bowl to the spin drier. Furthermore, the agglomerates of pellets may plug the pelletizer bowl and the spin drier, so that the extrusion line has to be shut down in order to clean the plugged section, thus resulting in undesirable production interruptions. Also, the high number of pellet marriages shown in the final product is not acceptable in the customers' fabrication process: the adverse consequences of this agglomeration include an unwillingness on the customers' part to buy such a product.

Various systems have been proposed and are used to avoid or limit the tendency to pellets agglomeration, but fundamentally they can be subdivided in two methods:

1) introduction of a modifier within the polymer itself leading to a decrease of the tackiness by means of increasing of the crystallization kinetic or by a surface migration of the modifier
2) surface treatment of the pellets with fine powdery materials (both organic or inorganic like for instance HDPE, talc, silica), or liquid compounds available for this purpose on the market under different trademarks.

To this end, materials such as bisoleamide, have been added to the monomer reaction mixture prior to the formation of the polymer. The bisoleamide is not miscible with the polymeric material and, in time, migrates to the surface of the particle to provide a coating which resists agglomeration. It is also known coating with silica and talc powders the surface of polymer particles to inhibit agglomeration.

It is also known to apply a micro-fine polyolefin powder coating onto polymeric pellets to decrease the tackiness of the pellets. The micro-fine powder can be applied by incorporating the powder into the cutting water of an underwater pelletizing device, which cools the pellets after cutting.

Alternatively, the micro-fine powder can be used to coat the already shaped polymer pellets by tumbling, airveying or similar post-treatments. Also, the coating may be applied by electrostatically charging a bath of a fluidized powder with an electrical potential different from that of the polymer pellets.

Furthermore, it is known the use of polymeric nucleants to accelerate crystallization, including polyolefinic nucleants such as High density Polyethylene (HDPE) powder. They act as an external pelletizing aid to reduce the occurrence of pellets agglomeration. Polyolefinic powder nucleants typically have density less than water and thus float on the surface of the water bath or tank where the polymer pellets are treated. The floating causes an overflow of the polyolefinic powder from the water bath, which can result in processing disruptions requiring the occasional cleaning up of equipment and work environment. The success of this prior art method is strongly dependent on the good dispersion of the polyolefinic powder in the water tank containing the polymer pellets. Therefore, a vigorous stirring is generally required to obtain the effective benefit of the polyolefinic powder as a pelletizing aid. This method of reducing pellets agglomerations is very messy and labor intensive. Even under the best circumstances, a significant fraction of the polymer production has to be discarded, due to poor pellet quality and pellets agglomeration.

The use of organometallic surfactants to minimize the pellet agglomeration problem is also known in the art. However, when these surfactants are used with the effective amount, it often results in severe foaming problems, and the foam may overflow from the water tank to the floor and thereby cause messy operation and unsafe working conditions. The combination of a defoamer, such as FOAMTROL® and an organometallic surfactant, such as zinc stearate has been used with some success. However, this combination has the drawback of the potential carcinogenic nature of FOAMTROL®.

U.S. Pat. No. 4,359,544 proposes the use of a nucleating agent package as pelletizing aid, which package is a mixture of HDPE and stearamide. However, both HDPE and stearamide do not disperse well in water, and thus do not work well in a water bath as pelletizing aids.

U.S. Pat. No. 5,206,292 proposes the use of oxidized high-density polyethylene powder to minimize the agglomeration of freshly manufactured polyolefin pellets. According to the working examples of this patent, the pellets are fed to a translucent mixing tank containing water and small amounts of oxidized HDPE. The slurry is maintained in agitation using an air activated stirrer. This technique has many drawbacks. First, oxidized HDPE is not approved by the FDA for applications involving direct food contact. Moreover long stirring times, of about 30 minutes, are required to achieve a good dispersion of oxidized HDPE in the cooling agent containing the polymer pellets. Also, in the regions far from the stirrer some pellets can easily stick to each other before crystallization is completed.

U.S. Pat. No. 5,623,012 relates to a method for reducing the tackiness of freshly manufactured polyolefin pellets. The method involves the addition of a mixture containing a polymeric nucleant and a metallic fatty acid surfactant to a cooling agent. Zinc stearate as an organic metallic surfactant, and HDPE powder as a polymeric nucleant are added to the cooling agent. Water is preferably used as the cooling agent. The obtained slurry along with the polymer pellets are pumped into a metal crystallization tank. An agitator is used to stir the water in the tank in order to disperse more uniformly the HDPE powder and the metallic surfactant. According to the disclosure of this patent a synergistic effect is obtained by using a HDPE powder and a metallic surfactant, so that both the pellets agglomeration and foaming are reduced. However, the technique of treating polymer pellets as described in this patent is very chaotic and messy. Having a density lower than water, HDPE powder tends to float on the water: in order to ensure an acceptable dispersion of said powder into the entire volume of the crystallization tank, a continuous and intensive stirring must be provided. Due to this stirring, the movement of the pellets inside the crystallization tank is very random so that a part of them reach the outlet of the tank much before the remaining pellets: different residence times are involved in running the crystallization tank. In the regions where a good dispersion of HDPE powder is not achieved, some pellets can easily stick to each other before the completion of crystallization, while other pellets can leave the crystallization tank without being sufficiently cooled and hardened, thus giving rise to sticking problems in the further steps of the process.

U.S. Pat. No. 6,328,728 relates to a process for applying a polymeric coating onto a polymeric substrate in order to provide anti-agglomeration properties to the polymer substrate, such as polymer pellets. The coated polymeric substrate may be produced by incorporating the polymeric coating into an aqueous coating composition and applying by spraying said composition to the surface of the substrate particles. The method of U.S. Pat. No. 6,328,728 includes introducing the polymeric pellets into an auger assembly, which conveys the polymer pellets through a spray zone to an outlet zone. During operation of the auger assembly, the pellets are sprayed with an aqueous coating composition as the pellets are mechanically mixed while being conveyed forward. From the outlet zone, the resulting coated pellets may be conveyed to a drying apparatus, such as a fluidized bed. The fluidized bed operates at elevated temperatures and provides an air flow, which thoroughly agitates the coated pellets. This combination of elevated temperature and agitating air flow removes water and other volatile components from the polymer pellets. The coated pellets thereafter are cooled and transferred to a packaging or storage station.

WO 04/111111 describes a process for treating polymer pellets to reduce their tendency to agglomeration, the process comprising the cooling of polyolefin pellets while they flow upward along a cooling tower, wherein the pellets meet in counter-current a descending flow of a cooling agent, preferably water. The cooled pellets are collected from the top of said tower after a residence time ranging from 2 to 20 minutes. During this treatment the surface of each pellet is efficiently cooled and hardened, at the same time minimizing the surface contact between them.

Although the process of WO 04/111111 reveals efficient in preventing tackiness problems along the line connecting the underwater pelletizer to the centrifugal drier aimed to dry the polymer, some drawbacks may be associated with the claimed process, mainly the need to install a bulky apparatus, i.e. the cooling tower, which requires many process devices such as a pump, a heat exchanger, a water flow controller (FC) and a pellets level controller (LC). In fact, the flow of cold water descending in continuous along the tower implies a continuous recirculation of water by a pump from bottom to top of the tower and also the continuous refrigeration of the water. Moreover, the degree of "expansion" of the pellets inside the tower must be controlled by means of a Flow Controller (FC), placed on the feed line of cold water to the tower, while the hold-up of polymer pellets inside the tower has to be measured and adjusted by means of a Level Controller (LC), via a differential pressure cell. Thus, the use of the cooling tower of WO 04/111111 implies additional operative costs and maintenance costs. Moreover, it has to be considered that for the tackiest and soft polymer grades the residence time within the cooling tower is not sufficient to send the pellets directly to the spin drier avoiding their agglomeration during the drying step.

In view of the many drawbacks correlated with the use of the above described prior art pellets treatments, it would be desirable to provide an innovative and simpler method for efficiently treating polymer pellets in order to prevent their agglomeration in the process equipment located downstream the pellets cutting system.

It is therefore an object of the present invention a process for the anti-sticking treatment of polymer pellets comprising:
a) pelletizing the polymer in the presence of cooling water to provide polymer pellets;
b) drying the polymer pellets by means of a centrifugal drier; wherein in step b) an aqueous composition comprising an anti-sticking agent is metered inside said centrifugal drier.

In the description of this Patent Application "antisticking agent" is defined as a chemical compound, which by means of contact with the pellets surface is able to coat the pellets surface, thus reducing the tackiness of the polymer pellets.

The process of the present invention is particularly efficient in causing a significant reduction of the tackiness of polymer pellets obtained from extrusion and pelletization.

The feed of an anti-sticking agent directly inside the centrifugal drier reveals particularly efficient in the reduction of the tackiness of polymer pellets, so that the pellets can be afterwards stored without agglomeration problems. The centrifugal effect generated by the rotor of the drier contributes to enhance considerably the adherence of the anti-sticking additives to the surface of the polymer pellets.

All the types of polymers with a high softness and tackiness or with a long hardening time may be suitably treated according to the process of this invention. The term polymers as used herein, unless otherwise specified, includes homopolymers, copolymers, terpolymers and all other known combinations or forms of polymeric materials. The homopolymers generally have less crystallization problems, and accordingly their respective pellets show minor tendency to agglomerate each other.

Polyolefin copolymers typically exhibit slower crystallization rates leading to longer crystallization times. As earlier noted, the excessive stickiness resulting from slow crystallization is undesirable. The problem generally occurs in pellets deriving from all the polymers denominated as Thermoplastic Elastomers (TPE) and Thermoplastic polyolefins (TPO). As an example, ethylene copolymers, propylene copolymers, butene-1 copolymers, polyesters, polyethylene terephthalate, ethylene-vinyl-acrylate, styrene-butadiene and styrene-ethylene-butylene copolymers may be mentioned. The process of present invention applies to the anti-sticking treatments of polymer pellets coming from extrusion and pelletization, which may be performed according to well known conventional techniques. The extrusion has the function of mixing the molten polymer with suitable additives, fillers and pigments and to pump the compounded polymer through a die plate, thus obtaining polymer strands that are cut into pellets by the action of rotating knife blades.

The polymer pelletization of step a) may be an underwater pelletization, a water ring pelletization, or a wet strand pelletization. The cutting device of step a) may act on the molten polymer strands coming from the extruder, or alternatively on the cooled polymer strands, formed upstream the cutting device. As a consequence, the cutting device may belong to an underwater pelletizer, a water ring pelletizer or a wet strand pelletizer.

The pelletization step a) is performed in the presence of water as the cooling agent. The presence of water avoids the pellets agglomeration immediately after their cutting, since contact with cooling water promotes the pellets crystallization, so that their surface is gradually hardened.

According to the invention, a continuous flow of cooling water picks up the formed polymer pellets and conveys them from step a) to the centrifugal drier of step b). The amount of cooling water is such that the weight ratio $H_2O$/pellets ranges from 10 to 500, preferably from 30 to 300.

The temperature of the cooling water before to come in contact with the pellets ranges generally from 5° to 50° C. The length of the water transport line determines also the temperature of the pellets as they enter the centrifugal drier, said temperature being generally comprised between 10° C. and 60° C.

Preferably, the flow of cooling water coming into contact with the pellets contains specific additives that prevent the pellets from sticking each other, along the transport line connecting the cutting device of step a) to the centrifugal drier of step b). Said additives are preferably selected from silicon oils, aqueous solutions of salts of fatty acids, emulsions containing food oils, dispersions of polyethylene wax, suspensions of metal stearates, emulsions of sterically hindered phenols.

A catcher of polymer agglomerates is usually installed upstream the centrifugal drier. Said agglomerates catcher serves to protect the drier by removing larger pellet clumps (agglomerates), eventually formed in the line between the pelletization step and the centrifugal dryer. Therefore, the pellet agglomerates are removed away, while the flow of water and polymer pellets is able to reach the predewatering section of the drier, where most of the process water is separated from the pellets. The predewatering section of the drier consists of a suitable number of screening stages.

The aqueous stream containing polymer pellets enters the bottom section of the centrifugal drier, which comprises a rotor provided with lifter elements and a stationary cylindrical screen built up in one or more vertically arranged modules.

The rotor is placed along the axis of the drier and runs within the stationary cylindrical screen. The openings of this cylindrical screen are such to retain the pellets between the rotor and the screen itself, while the water can be continuously separated through the cylindrical screen. The rotor speed generally ranges from 200 to 2.000 rpm. In view of the centrifugal force and the design of the lifter elements inside the rotor, the polymer pellets are thrown against the screen and move upward along the rotor following a helical path.

Most of the water is removed away through the cylindrical screen of the drier, while the pellets flow upward to the upper section of the drier. The separated water is usually continuously cooled and recycled to the pelletization step a).

According to the innovative process of the invention, an aqueous composition comprising an anti-sticking agent is continuously introduced inside the centrifugal drier by a metering system. The injection points of said aqueous composition are suitably placed in correspondence of the upper half of the stationary cylindrical screen of the drier, preferably along the upper third portion of the screen itself. Accordingly, the anti-sticking compounds meet the polymer pellets in a zone of the drier, where the residual amount of water is usually less than 1% in weight.

In order to improve the efficiency of the process of the invention, the upper modules of the cylindrical screen of the drier may be modified, so as to prevent the passage of the water and anti-sticking agents through the openings of the cylindrical screen. According to a first embodiment of the invention, the upper half portion of this cylindrical screen may be replaced by means of one or more solid sheets, so that the feeding points of the aqueous composition of the invention may be suitably placed through the surface of said solid sheets.

According to an alternative embodiment of the invention, the upper half portion of the cylindrical screen of the drier may be simply covered by means of solid sheets, so that the feeding points of the aqueous composition may be placed through the surface of said solid sheets.

These solid sheets prevent the just injected anti-sticking components to be quickly expelled away through the openings of the cylindrical screen of the drier, thus maximizing the amount of the anti-sticking agent coming into contact with the polymer pellets.

The aqueous composition metered inside the drier contains the anti-sticking agents in an amount from 1% to 50% by weight, preferably from 2% to 40%. The suitable amount obviously varies depending on the selected anti-sticking components.

The anti-sticking agent is metered in an amount ranging from 50 to 5000 ppm by weight, preferably from 150 to 2000 ppm wt, with respect to the flow rate of polymer pellets entering the centrifugal drier.

Before the feeding to step b) of the invention the aqueous composition may be atomized or nebulized in a stream of air or nitrogen in order to improve the coating efficiency. The suitable feeding temperature is normally close to the room temperature, and may range from 5 to 40° C., but it can be also increased by heating to higher values, depending on the thermal stability of the aqueous composition.

The aqueous composition of step b) of present invention may be selected from aqueous solutions, aqueous emulsions, aqueous dispersions comprising an anti-sticking agent.

Throughout the present Application the term "aqueous dispersion" is meant as a two-phase system consisting of small solid particles dispersed in water, the particles dispersion being achieved both by means of agitation or not, so that the term "aqueous dispersion" also includes aqueous suspensions.

The anti-sticking agents used in the invention are selected from silicon oils, salts of fatty acids, polyethylene waxes, metal stearates, sterically hindered phenols, food oils.

The process of the invention will be now described in detail with reference to the enclosed FIG. 1, which is an illustrative embodiment of present invention, not limiting the claimed process.

Figure 1:
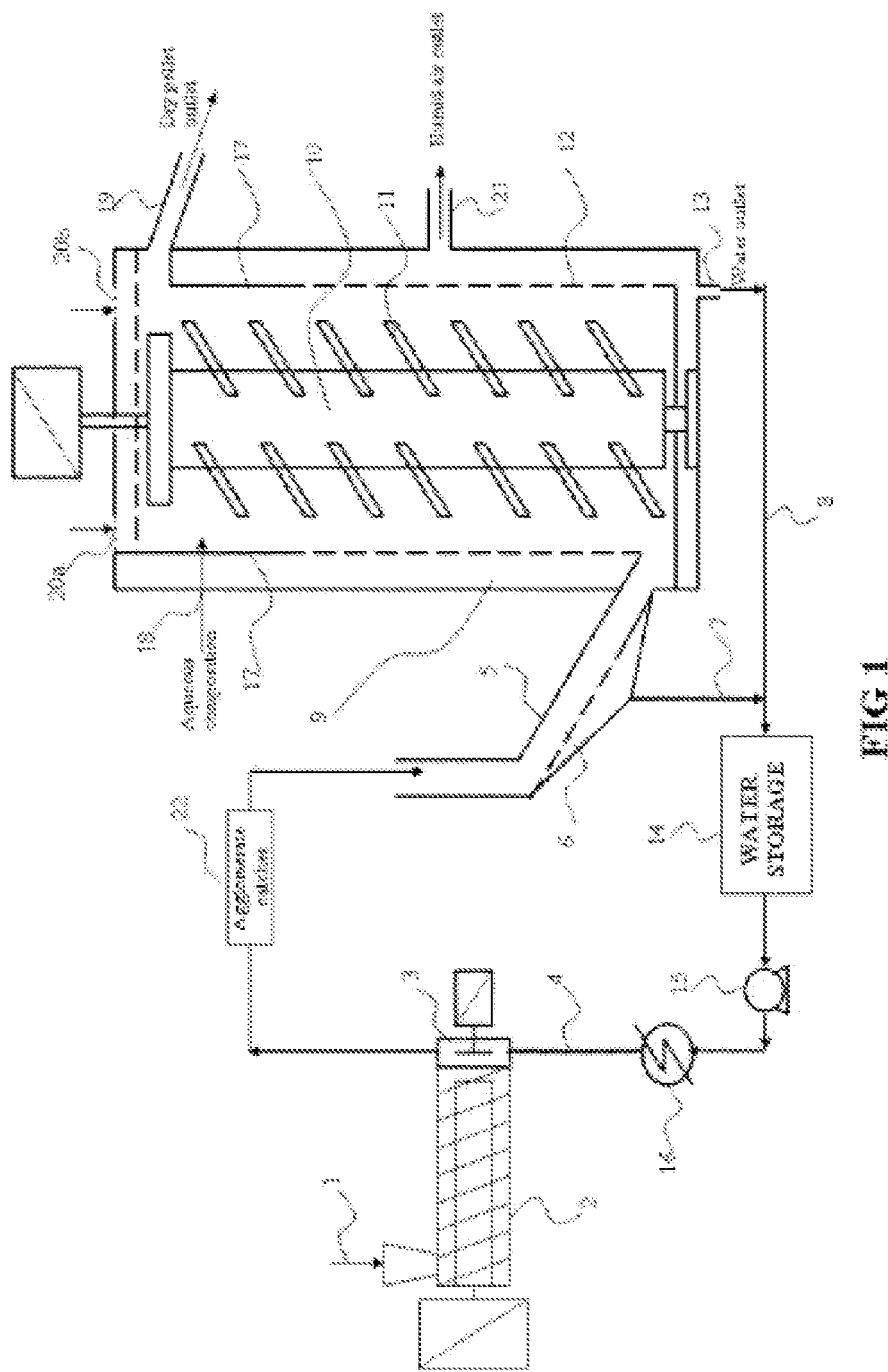

With reference to FIG. 1, polymer particles 1 coming for example from a polymerization reactor (not shown) enter an extruder 2, wherein the polymer is molten and compounded by adding specific ingredients, like fillers and/or pigments, to improve the polymer properties. Then, the molten polymer is forced to flow through a die plate before being cut into pellets in the underwater pelletizer 3.

A continuous flow of cooling water 4 picks up the formed pellets and conveys them through the agglomerate catcher 22 and to the predewatering section 5, which is connected to the bottom of the centrifugal drier. The predewatering section 5 is provided with a dewatering screen 6, which separates most of the cooling water from the pellets. The separated water passes through the dewatering screen 6 and via line 7 reaches the water recycle line 8.

The stream of pellets and remaining water enters the bottom section of the centrifugal drier 9.

The rotor 10 of drier 9 is provided with lifter elements 11 which promote the upward flow of the pellets with a spiral movement.

The stationary cylindrical screen 12 of the drier 9 has openings suitable to retain the pellets between rotor 10 and cylindrical screen 12, while the water is expelled through the openings of screen 12. Separated water collects at the bottom of drier 9 and exits via the discharge port 13 up to join the water recycle line 8. Water coming from discharge port 13 together with the water coming from the dewatering screen 6 is conveyed via line 8 to the storage tank 14. The water of storage tank 14 may be re-used in the process by cooling it to the temperature requested in the pelletization step b): in this case, water coming from storage tank 14 is pressurized by pump 15 and is cooled by the heat exchanger 16, before the feeding to the underwater pelletizer 3 via line 4.

According to the invention, an aqueous composition comprising an anti-sticking agent is continuously introduced inside the centrifugal drier 9 by a metering system. As shown in FIG. 1, the upper third portion of the cylindrical screen 12 is replaced by means of a solid sheet 17, where one or more feeding points 18 of the aqueous composition are placed.

Once introduced in the upper portion of the drier 9, the anti-sticking compounds are quickly released from the aqueous composition and can come directly into contact with the surface of the polymer pellets. The pellets treated by the process of the invention are hence discharged from the top of the drier 9 via discharge line 19.

The centrifugal drier 9 is provided with an external fan (not shown in FIG. 1) generating a countercurrent flow of dry air entering the top of the drier 9 via inlets 20a, 20b. This downward flow of dry air is aimed to remove the residual surface moisture from the pellets. Humid air and vapor are removed away from the drier by means of discharge port 21.

In agreement with the here above described process, the anti-sticking compounds are quickly released from the aqueous composition and can come directly into contact with the polymer pellets. The motion of the pellets generated by the rotor allows to expose their surfaces to the anti-sticking compound, with an improvement in achieving an uniform deposition of the anti-sticking compound, thus increasing the mutual flowability of the polymer pellets.

According to an alternative embodiment of the invention, the above anti-sticking additives can be metered directly inside the drier, without to be dispersed or dissolved in water. It is therefore another object of the invention a process for the anti-sticking treatment of polymer pellets comprising:
a) pelletizing the polymer in the presence of cooling water to provide polymer pellets;
b) drying the polymer pellets by means of a centrifugal drier, wherein in step b) an anti-sticking agent is metered inside said centrifugal drier.

The process of the invention allows treating directly the surface of the polymer pellets with a metered amount of antisticking additives with a minor modification of the upper portion of a commonly marketed centrifugal drier, and without the need to use any other important equipment for the distribution of the additive over the pellets.

It is therefore a further object of the invention a centrifugal drier comprising a rotor provided with lifter elements and a stationary cylindrical screen build up in one or more vertically arranged modules, said centrifugal drier being characterized in that:
the upper third portion of said cylindrical screen is covered by one or more solid sheets;
injection points are placed through the surface of said one or more solid sheets for metering an aqueous composition comprising an anti-sticking agent.

The centrifugal drier of present invention is used for the task of distributing the anti-sticking agent over the pellets in addition to its normal task of pellet drying.

The following examples have to be considered representative and non-limiting of the scope of the present invention.

EXAMPLES

Polymer Extrusion

It is performed by a Coperion W&P ZSK40SC twin screw extruder operated under the following conditions: screw speed=160 rpm; polymer flow rate=30 kg/h; melt temperature=190° C.

Pelletization Step

It is operated by an underwater pelletizer UG50/25 by Filtec with a die plate having 3 holes of 2.5 mm diameter and a cutter hub with 3 knives operating at 2200 rpm.

Drying Step

It is performed in a centrifugal drier in which the upper third portion of the cylindrical screen is covered by a solid sheet.

Flowability Test—Procedure A

The "flowability" of a pellet may be measured as the ability of the pellet to fall freely through an orifice placed at the bottom of a pipe. A sample of 4 kg of pellets is loaded in a pipe (height=110 cm; diameter=10.8 cm) having a conical bottom (orifice diameter=5.5 cm). The pipe is kept at a temperature of 40° C. by means of a hot oil jacket. The sample of pellets is compressed by a weight of 48 kg and the polymer is left inside the pipe for 6 hours under isothermal conditions.

The pellets are then discharged by opening the on-off valve placed on the bottom of the pipe. The time requested by the pellets to flow outside the pipe and to empty completely the pipe is therefore measured. Lower the time, higher the flowability of the pellets.

Flowability Test—Procedure B

An alternative method for measuring the flowability of the pellets, representing the behaviour of materials commercially packaged in bags, is to verify the conditions of pellets packaged in 20 kg bags, after a prolonged (48 hours) compression (400 kg/m2).

Bags are opened after the compression test verifying if pellets are free flowing and checking the cohesion level and size of agglomerates eventually formed.

The bags are opened by cutting them on three sides and observing if the pellets flow freely under their weight placing said bag on a horizontal plane and overhanging it through the plane border.

Example 1

An ethylene/butene-1 copolymer with an ethylene content of 8% by weight (Mw/Mn=2.5; Mn=171.360) is subjected to the process of the invention according to the plant set-up shown in FIG. 1.

The ethylene/butene-1 copolymer is extruded by the extruder 2 and successively cut into pellets by the underwater pelletizer 3. The formed pellets (30 Kg/h) are cooled by the contact with a flow of cooling water (9.000 Kg/h) flowing along line 4 at a temperature of 20° C. The cooling water contains 0.2% by weight of Irgastab PVC 11 EM. The flow of cooling water picks up the pellets conveying them to the pre-dewatering section 5 of the centrifugal drier.

The centrifugal drier is operated at a rotation velocity of 1500 rpm and its stationary cylindrical screen 12 is provided with round openings (diameter=1.5 mm)

Separated water collects at the bottom of drier and exits via the discharge port 13 up to join the water recycle line 8.

An aqueous solution containing 15% weight of potassium salts of fatty acids (sold as Kemi SBC07) is subjected to dilution in water to a final concentration of potassium salts of fatty acids equal to 2.5% weight.

360 g/h of the above aqueous solution are continuously metered together with compressed air into the injector 18, placed through the surface of the solid sheet 17, as shown in FIG. 1. The metered amount of anti-sticking agents corresponds to 300 ppm by weight with respect to the flow rate of polymer pellets entering the centrifugal drier 9.

The pellets treated by means of the above solution are discharged from the top of the centrifugal drier and are collected into plastic bags, each containing 20 kg of polymer. The flowability of the pellets is measured according to procedure B: the bags are subjected to compression conditions with a load of 400 kg/m² and after a test time of 48 hours, the pellets bags are opened and polymer pellets are found to be free flowing without showing agglomerates.

Example 2

Example 1 is repeated with the only difference in that the metered amount of aqueous solution of potassium salts of fatty acids of Example 1 is 180 g/h, so that the metered amount of anti-sticking agent corresponds to 150 ppm by weight with respect to the flow rate of polymer pellets entering the centrifugal drier 9.

The pellets discharged from the drier are subjected to the same procedure of Example 1. After a test time of 48 h, the pellets bags are opened and pellets are found to be free flowing, showing only few pellet agglomerates that could be easily disrupted.

Example 3

Example 1 is repeated with the difference that an aqueous dispersion of micronised polyethylene wax is metered inside the centrifugal drier.

An aqueous dispersion containing 40% weight of micronised polyethylene wax (sold as HORDAMER® PE03) is subjected to dilution in water to a final concentration of polyethylene wax equal to 13.3% weight.

300 g/h of the above dispersion are continuously metered together with compressed air into the injector 18, placed through the surface of the solid sheet 17, as shown in FIG. 1. The metered amount of anti-sticking agent corresponds to 1330 ppm by weight with respect to the flow rate of polymer pellets entering the centrifugal drier 9.

The pellets discharged from the drier are subjected to the same procedure of Example 1. After test time, the pellets bags are opened and pellets are found to be free flowing, without showing pellet agglomerates.

Example 4

Example 1 is repeated with the difference that an aqueous suspension of calcium stearate is metered inside the centrifugal drier.

An aqueous suspension containing 50% weight of calcium stearate (sold as FLUOCAST®) is subjected to dilution in water to a final concentration of calcium stearate equal to 5.0% weight.

400 g/h of the above aqueous suspension are continuously metered together with compressed air into the injector 18, placed through the surface of the solid sheet 17, as shown in FIG. 1. The metered amount of anti-sticking agent corresponds to 667 ppm by weight with respect to the flow rate of pellets entering the centrifugal drier 9.

The pellets discharged from the drier are subjected to the same procedure of Example 1. After test time, the pellets bags are opened and pellets are found to be free flowing, without showing pellet agglomerates.

Example 5

Comparative

Example 1 is repeated with the difference that no aqueous composition containing anti-sticking additives is metered into the injector 18 located in the upper portion of the centrifugal drier 9.

Sticking of pellets to the walls of discharge conduit 19 of the drier is observed, as well as pellets agglomeration each other, with the consequence that regular discharge of the pellets from the centrifugal drier is hindered.

The pellets discharged from the drier are subjected to the same procedure of Example 1. After test time, the pellets bags are opened and pellets are found to be not free flowing, showing large agglomerates that cannot be disaggregated even applying mechanical action.

Example 6

Comparative

Example 1 is repeated with the difference that 360 g/h of the same aqueous solution of potassium salts of fatty acids used in Example 1 are not introduced inside the centrifugal drier, but are fed to the flow of water and pellets at the end portion of pre-dewatering section 5, immediately before the inlet of centrifugal drier 9.

Sticking of pellets at the discharge of the drier 19 is observed, as well as pellets agglomeration, both preventing the regular discharge of the pellets from the centrifugal drier.

The pellets discharged from the drier are subjected to the same procedure of Example 1. After test time, the pellets bags are opened and pellets are found to be not free flowing, showing large agglomerates that cannot be disaggregated even applying mechanical action.

Example 7

A styrene-butadiene-styrene copolymer (Kraton D1155BJ) with MFR=3.7 g/10 min (190° C./2.16 kg) is subjected to same extrusion conditions as described in example 1.

The styrene-butadiene-styrene copolymer is extruded by the extruder 2 (reference to FIG. 1) and successively is cut into pellets by the underwater pelletizer 3. The formed pellets (30 Kg/h) are cooled by the contact with a flow of cooling water (9.000 Kg/h) flowing along line 4 at a temperature of 30° C. The flow of cooling water picks up the pellets conveying them to the pre-dewatering section 5 of the centrifugal drier.

The centrifugal drier is operated at a rotation velocity of 1500 rpm and its stationary cylindrical screen 12 is provided with round openings (diameter=1.5 mm)

An aqueous solution containing 15% weight of potassium salts of fatty acids (sold as Kemi SBC07) is subjected to dilution in water to a final concentration of potassium salts of fatty acids equal to 5% weight.

Respectively 180 and 360 g/h of the above diluted solution containing Kemi SBC07 are tested in sequence according to the process of present invention: this solution is metered together with compressed air into the injector 18, placed through the surface of the solid sheet 17 of the centrifugal drier, as shown in FIG. 1.

The pellets treated by means of the above aqueous solution are discharged from the top of the centrifugal drier and are collected into plastic bags, each containing 20 kg of polymer. The flowability of the pellets is measured according to procedure B. After test time, the pellets bags are opened and polymer pellets are found to be respectively free flowing showing only few agglomerates that can be easily disrupted and free flowing without showing any agglomerate.

Comparative Example 7

Example 7 is repeated with the difference that no aqueous composition containing anti-sticking additives is metered into the injector 18 located in the upper portion of the centrifugal drier 9.

The flowability of the pellets is measured according to procedure B. After test time, the pellets bags are opened and pellets are found to be not free flowing, showing large agglomerates that need strong mechanical action for being disrupted

Example 8

A soft propylene/ethylene copolymer (Softell 7469 XEP, ethylene content 40% wt) comprising a matrix of polypropylene and a heterophasic copolymer of ethylene/propylene is subjected to the process of the invention according to the plant set-up shown in FIG. 1. Same extrusion conditions as for example 1 are applied.

The formed pellets (30 Kg/h) are cooled by the contact with a flow of cooling water (9.000 Kg/h) flowing along line 4 at a temperature of 40° C. The flow of cooling water picks up the pellets conveying them to the pre-dewatering section 5 of the centrifugal drier.

An aqueous solution containing 15% weight of potassium salts of fatty acids (sold as Kemi SBC07) is subjected to dilution in water to a final concentration of potassium salts of fatty acids equal to 5% weight.

This aqueous solution is metered at different dosing rates (see table 1, where ppm by weight of Kemi SBC07 over the flow rate of pellets are indicated) together with compressed air into the injector 18, placed through the surface of the solid sheet 17 of the centrifugal drier, as shown in FIG. 1.

The pellets treated by means of the above aqueous solution are discharged from the top of the centrifugal drier and are subjected to a flowability test a 40° C., as for procedure A. The results of the flowability test are shown in Table 1

Comparative Example 8

Example 8 is repeated with the difference that in a first case no anti-sticking additive is metered into the centrifugal drier 9, while in a second case the aqueous solution of potassium salts of fatty acids used in Example 8 is fed to the flow of water and pellets at the end portion of pre-dewatering section 5, immediately before the inlet of centrifugal drier 9. The pellets are discharged from the top of the centrifugal drier and are subjected to the flowability test a 40° C. as for procedure A: the results of the flowability test are shown in Table 1

Example 9

The soft propylene/ethylene copolymer of example 8 is subjected to the process of the invention according to the plant set-up shown in FIG. 1 An aqueous dispersion containing 40% weight of micronised polyethylene wax (sold as HORDAMER® PE03) is subjected to dilution in water to a final concentration of polyethylene wax equal to 13.3% weight.

This aqueous solution is metered at different dosing rates (see table 2, where ppm by weight of polyethylene wax over the flow rate of pellets are indicated) together with compressed air into the injector 18, placed through the surface of the solid sheet 17 of the centrifugal drier, as shown in FIG. 1.

The pellets treated by means of the above aqueous solution are discharged from the top of the centrifugal drier and are subjected to the flowability test a 40° C. according to procedure A: the results of the flowability test are shown in Table 2.

Comparative Example 9

Example 9 is repeated with the difference that in a first case no anti-sticking additives is metered into the centrifugal drier 9, while in a second case the same solution of micronised polyethylene wax used in Example 9 is fed to the flow of water and pellets immediately before the inlet of centrifugal drier 9. The pellets are discharged from the top of the centrifugal drier and are subjected to the flowability test a 40° C. according to procedure A: the results of the flowability test are shown in Table 2.

TABLE 1

|  | Example 8 | | | Comp. Example 8 | |
| --- | --- | --- | --- | --- | --- |
|  |  |  |  | No additive | Injection upstream drier |
| Anti-Sticking (ppm) | 300 | 750 | 1500 | 0 | 750 |
| Discharge time (sec) | 41 | 33 | 16 | 97 | 110 |

TABLE 2

|  | Example 9 | | | Comp. Example 9 | |
| --- | --- | --- | --- | --- | --- |
|  |  |  |  | No additive | Injection upstream drier |
| Anti-Sticking (ppm) | 800 | 2000 | 4000 | 0 | 2000 |
| Discharge time (sec) | 29 | 23 | 15 | 97 | 80 |

The data shown in the above Tables 1 and 2 demonstrate that, operating according to the operative conditions claimed in present application, satisfactory results are achieved in term of pellets flowability.

What is claimed is:

1. A process for the anti-sticking treatment of polymer pellets comprising:
    a) pelletizing polymer in the presence of cooling water to provide polymer pellets; and
    b) drying the polymer pellets by means of a centrifugal drier,
    wherein in step b) an aqueous composition comprising an anti-sticking agent is metered inside said centrifugal drier
    wherein said centrifugal drier comprises a rotor provided with lifter elements and a stationary cylindrical screen built up in at least one vertically arranged module wherein an upper third portion of said stationary cylindrical screen is covered by at least one solid sheet and at least one injection point is placed through the surface of said at least one solid sheet which is configured for metering said anti-sticking agent.

2. The process according to claim 1, wherein step a) is performed in an underwater pelletizer, a water ring pelletizer or a wet strand pelletizer.

3. The process according to claim 1, wherein a continuous flow of said cooling water conveys the polymer pellets from step a) to the centrifugal drier of step b).

4. The process according to claim 1, wherein said anti-sticking agent is metered in an amount ranging from 50 to 5000 ppm by weight with respect to the flow rate of polymer pellets entering the centrifugal drier.

5. The process according to claim 1, wherein said aqueous composition is selected from aqueous solutions, aqueous emulsions, or aqueous dispersions comprising an anti-sticking agent.

6. The process according to claim 1, wherein said anti-sticking agent is selected from silicon oils, salts of fatty acids, polyethylene wax, metal stearates, sterically hindered phenols, or food oils.

7. A process for the anti-sticking treatment of polymer pellets comprising:
    a) pelletizing polymer in the presence of cooling water to provide polymer pellets; and
    b) drying the polymer pellets by means of a centrifugal drier,
    wherein in step b) an anti-sticking agent is metered inside said centrifugal drier
    wherein said centrifugal drier comprises a rotor provided with lifter elements and a stationary cylindrical screen built up in at least one vertically arranged module wherein an upper third portion of said stationary cylindrical screen is covered by at least one solid sheet and at least one injection point is placed through the surface of said at least one solid sheet configured for metering said anti-sticking agent.

8. A centrifugal drier comprising a rotor provided with lifter elements and a stationary cylindrical screen built up in at least one vertically arranged module wherein,
    a) an upper third portion of said stationary cylindrical screen is covered by at least one solid sheet; and
    b) at least one injection point is placed through the surface of said at least one solid sheet configured for metering an aqueous composition comprising an anti-sticking agent.

* * * * *